May 24, 1966 D. W. GERI 3,252,669

TAPE DRIVE MECHANISM

Filed Dec. 16, 1963 4 Sheets-Sheet 1

INVENTOR.

DON W. GERI

BY

Townsend and Townsend

ATTORNEYS

May 24, 1966 D. W. GERI 3,252,669

TAPE DRIVE MECHANISM

Filed Dec. 16, 1963 4 Sheets-Sheet 2

INVENTOR.

DON W. GERI

BY

Townsend and Townsend

ATTORNEYS

INVENTOR.
DON W. GERI
BY
Townsend and Townsend
ATTORNEYS

INVENTOR.
DON W. GERI
BY
Townsend and Townsend
ATTORNEYS

United States Patent Office 3,252,669
Patented May 24, 1966

3,252,669

TAPE DRIVE MECHANISM

Don W. Geri, Sunnyvale, Calif., assignor to Precision Instrument Company, Palo Alto, Calif.

Filed Dec. 16, 1963, Ser. No. 330,822
10 Claims. (Cl. 242—55.13)

This invention relates to a tape drive system suitable for processing recording tape.

The conventional tape drive mechanism usually comprises a supply reel carrying a wind of tape which is subsequently delivered to a take-up reel past a recording station. During tape transport, some form of braking action of the tape feed from the supply reel must be effected in order to keep the tape under a substantially constant tension past the recording station. For maximum linearity of tape passage, a capstan drive is frequently used to pull the tape from a supply reel past the recording station; the tape is then wound independently on to a take-up reel. In ordinary tape recorders the available power not only allows this type of a system to function adequately but poses no problem in respect to the amount of power available. However, in miniaturized portable recorders where only an extremely small supply of power is either desirable or available, such conventional tape installations are either impracticable altogether or make undesirable power demands.

The principal object of this invention is to provide a novel tape drive system in which the power necessary to operate the tape transport is kept at an extremely low level; for example, a tape drive built in accordance with the teachings of this invention has been found to have a total capstan power consumption of only 2.003 milliwatts during a total recording time of 30 minutes while processing a tape of 2,250 inches in length. The tape used was Minnesota Mining Company's No. 8922, ⅛" wide by .0008 inch thick.

The present invention utilizes a constant torque motor or negator type spring interdrive between the supply and take-up reel in which the negator spring is in an unwound (pretensioned) position at the beginning of the recording cycle and causes the take-up reel to rotate a predetermined number of turns relative to the supply reel during a complete cycle. (A negator is a tight spiral spring of thin ribbon-like metal which tends to recoil itself with constant torque when unwound.) This predetermined number of turns is about equal to the additional turns that the take-up reel must rotate, compared to the supply reel, to wind upon itself one-half the total length of tape initially on the supply reel. During this interval the rate at which the tape passes the transducer or recording head is regulated by the constant speed characteristic of the capstan drive although minimal or no capstan power is required to transport the tape. Consequently, the interdrive between the two reels functions to rotate both reels in the same direction but at different rates while substantially constant tension is maintained throughout the tape path.

One of the features of this invention is that during the first half of the recording cycle, potential energy stored in the negator spring is converted to kinetic energy and utilized to supply most if not all of the power necessary to rotate both the supply reel and the take-up reels; although energy is consumed in rewinding the negator spring during the second half of the recording cycle, this absorption of energy results in proper regulation of the tension between the supply reel and the take-up reel during that part of the cycle without separate braking action. Consequently, the overall power consumption through an entire recording cycle is less than half that required by conventional tape recording means.

Negator springs or other constant torque devices have previously been used to regulate and motivate the turning of tape supply and take-up reels. In prior instances, however, the springs have been connected directly to the tape reel in which case, even though the spring exhibits constant torque, the demands of the tape reel differ because of the changing diameter of the reel, i.e. tape pack. Because of this factor, although the hub is provided with substantially constant torque, the torque conversion to the peripheral edge changes as the diameter of the reel varies. It is an object of this invention to provide a coupling between the negator motor or spring and the driven reels which inversely changes the torque transmission to the reel as the effective diameter of the reel changes. This is accomplished by coupling the negator to the reel hub through a length of flexible tape such as Mylar which is wound about one hub coaxial with a negator spool in which the opposite end of the tape is wound about the hub of the reel. The tape in its turns around the reel hub and its spool (which is coaxial with the negator spool) varies the effective diameter to change the torque conversion to the reels inversely with the number of turns of tape about the hub. The mechanism is further arranged so that the number of turns around the hub decreases as the number of turns of magnetic tape around the reel decreases to the midpoint and then rewinding in a manner most suited for constant torque thus effectively maintaining a substantially compensated torque conversion for reel rotation throughout the useful cycle of operation.

The device of this invention has the feature and advantage of providing a high degree of linearity of tape tension throughout the useful phase of operation without the necessity of providing outside means to compensate for the non-linear characteristics exhibited by previously known devices.

Another feature and advantage of this invention lies in the utility of this device in extremely low power units because of the factor of constant or compensated tape tension without the introduction of brakes or electronic circuits to effectuate the control usually required to maintain constant signal fidelity and amplitude.

Another feature and advantage derived from the elimination of separate braking action is that the capstan is able to make sufficient frictional contact with the tape by mere guide roller tracking without the necessity of a conventional pinch roller. This avoids the power loss in overcoming pinch roller drag found in ordinary tape drive systems.

A further feature and advantage of the use of a ribbon to transmit negator spring torque between reels is that a single negator spring and spring drive assembly may be used for a variety of tapes to be processed. This is contrasted to prior art devices which utilize the spring directly between reels. As a result of the latter and older technique, a given spring works with only one thickness and length of recording tape. With the present invention, merely by substituting different ribbon hubs, a number of different recording tapes can be used without changing the negator spring and its assembly.

Another feature and advantage of this invention is that since all of the rotating parts, including the capstan drive, comprise very low friction devices, the only major friction loss occurs in the drag of the tape across the transducer. Since this loss alone is quite small, the total power loss in the system is absolutely minimized.

Another object of this invention is that the entire negator mechanism is housed in the hub space between the two stacked reels. Accordingly the device can easily be fitted into a cassette or magazine for easy insertion and removal from a master recording housing.

Still another object of this invention is the use of a selfcontained magazine having stacked reels with a straight stretch of tape. Such arrangement permits direct instantaneous engagement of the magazine and tape stretch with the drive and transducer elements of a recording station.

Still further features and advantages will be seen from the detail specification and description which follows hereafter. Although the present specification shows one embodiment of this invention, it is intended to include all other schemes which may be practiced within the scope of the claims appended thereto.

Turning now to the drawings, FIG. 1 is a partial plan view of a tape recorder with the top cover removed.

Figure 1:
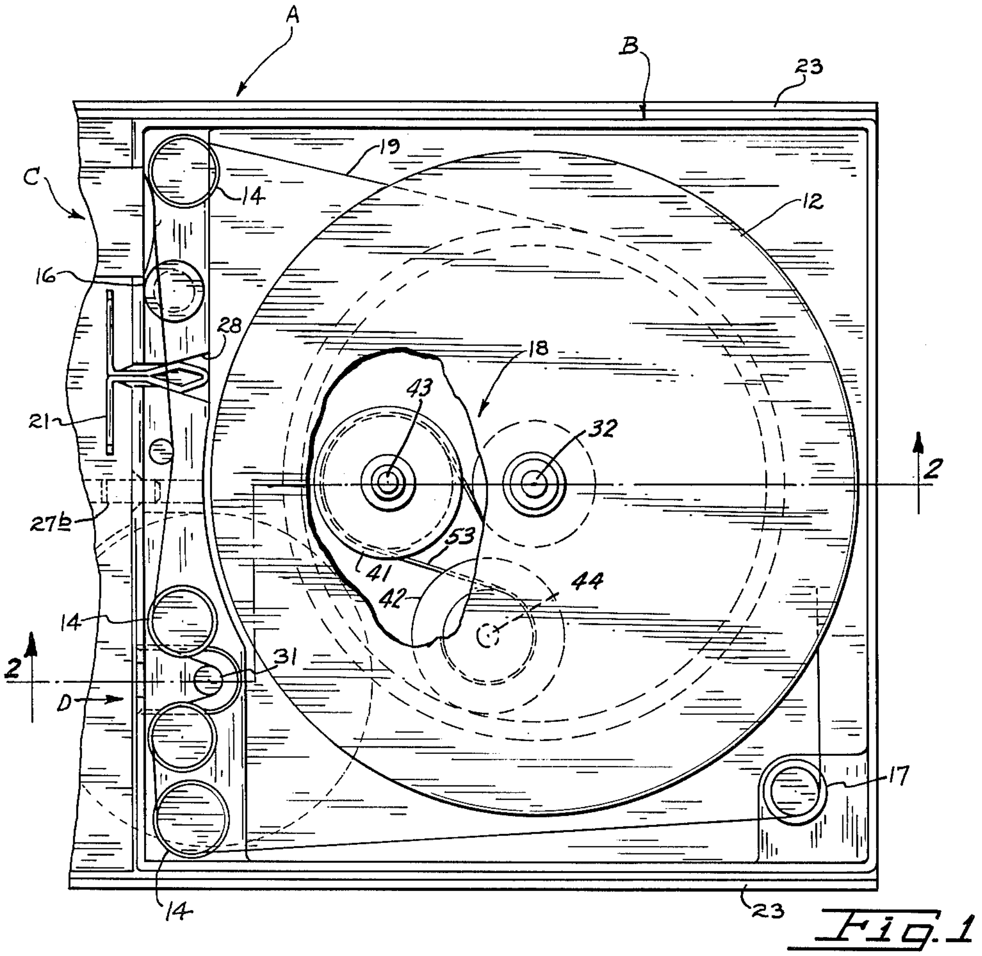
Figure 2:
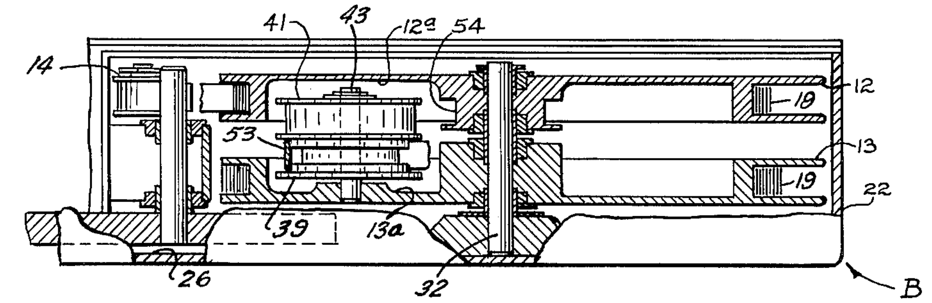
FIG. 2 is a sectional elevation indicated at lines 2—2 of FIG. 1.

In FIG. 1 a tape recorder is generally indicated at A, having a tape cartridge at B. Tape cartridge B contains supply reel 12 with web 12*a*, take-up reel 13 with web 13*a*, a plurality of guide rollers 14, 16 and 17, as well as negator or spring motor and film or torque transmitting tape assembly indicated generally at 18 to be described in greater detail hereinafter.

Recorder or information tape 19 is shown in FIG. 1 at the end of its recording cycle having been fully wound off of supply reel 12 onto take-up reel 13.

A transducer recording head indicated generally at C is integral with and forms a part of that portion of tape recorder A only partially indicated in the drawings. Similarly, a tape driving capstan is shown generally at D and will be described in greater detail hereinafter. Securing clip 21 is rigidly attached to the tape recorder portion which contains the recording electric circuitry (not shown), constant speed drive elements for capstan D, and transducer C.

The tape cartridge itself indicated generally at B is entirely contained in housing 22. The cartridge housing is detachable from that part of the tape recorder which contains the electric circuitry, transducer C, clip 21 and constant speed capstan D, and fits within the channel shaped extension 23 of the main body of the tape recorder. In addition, the tape cartridge is provided on one face with specially shaped slots 24, 25 and 26 as well as holes 27*a*.

When it is desired to commence recording, the tape cartridge is slidably inserted within the channel configuration of sides 23 and firmly pressed up against the tape recorder face so that transducer C is inserted in slot 24, holding clip 21 is inserted in slot 25, and, by spring action of the clip's forward portion, is held firmly in wedged shaped portion 28. Concurrently, capstan D is inserted in the upper narrow portion of slot 26 while its lower rotating element fits in the larger lower portion of slot 26. Prongs 27*b* (only one is shown) fit into holes 27*a* to achieve and maintain the proper close alignment of the tape cartridge with the recorder portion to hold the transducer and capstan in proper alignment with the tape.

At the outset of the recording cycle all of tape 19 is stored in a given number of turns on supply reel 12. A portion of the tape is threaded about the guide rollers enumerated above and attached in dead end position to take-up reel 13. In addition, rollers 14 and 16 maintain the proper tension for tape 19 over transducer C by causing a slight deflection of tape travel over the transducer.

When tape magazine B is inserted for recording as above described, puck 31 of capstan assembly D passes through the small portion of slot 27 and tractably engages tape 19 between two guide rollers 14. The plurality of guide rollers also maintain the tape in a descending path to accommodate the latter from a position at one elevation on supply reel 12 to that of a lower elevation on take-up reel 13, which is co-axially mounted directly beneath the supply reel.

Reels 12 and 13 are coaxially and rotatably mounted on spindle 32 which is rigidly attached at its base to tape cartridge housing 22. Flanged bushings 33 and 34 are inserted in the top of reel 12 and the bottom of reel 13 respectively. In turn, the flange of bushing 34 rides on washer 36 while the top of bushing 33 is protected from retainer 37 by washer 38. Flanged washers 33*a* and 34*a* are inserted in the bottom of the hub of reel 12 and the top of reel 13, respectively; the flanged portions of the washers abut each other giving the reels proper vertical alignment with minimum friction.

At the beginning of the recording cycle, negator spring 39 is completely pre-wound on the lower hub portion of spool 41. The other end of the negator spring is wrapped around spool 42. Spools 41 and 42 are mounted on spindles 43 and 44, respectively, which are themselves rigidly attached to the web of the core of take-up reel 13. The attachment of spindles 43 and 44 is about two-thirds the radial distance from the vertical axis of spindle 32 to the outer rim of spool 13 while angularly displaced from each other by about 30 degrees. Spacer block 45, which is rigidly attached to the web of spool 13 opposite the side holding spindles 43 and 44, acts as a counterweight for assembly 18 so that reel 13 remains in balance during rotation.

Figure 3:
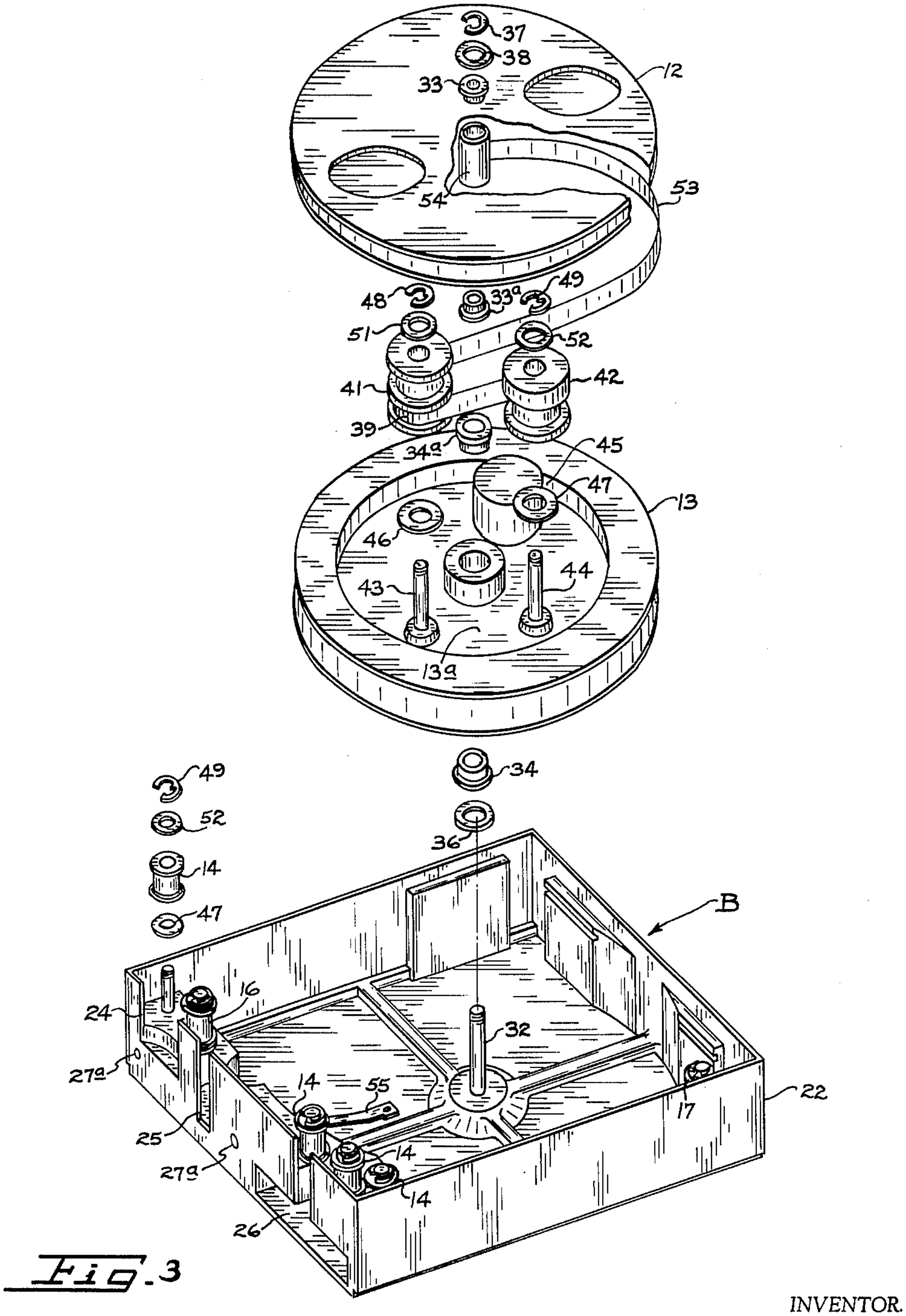
FIG. 3 is an isometric exploded view of the tape cartridge portion of the tape recorder shown in FIGS. 1 and 2.

Spools 41 and 42 rest on washers 46 and 47, respectively, and are protected from retainers 48 and 49 by washers 51 and 52. The securing arrangement of spool 42 is typical for attachment of rollers 14, 16, 17 and 29 as denoted in the exploded view of typical roller 14 in FIG. 3; ends of other roller spindles, except 29, are shown therein but not enumerated.

A Mylar, or the like, film 53, i.e. torque transmitting tape, is, at the outset of the recording cycle, completely wound on hub 54 which is integrally attached to reel 12. The other end of the film is attached to the upper hub portion of spool 41.

At the beginning of the recording cycle, and during periods of storage, the reels within the tape cartridge or magazine tend to rotate due to the action of pre-wound negator spring 39 tending to rewrap itself about spool 42 to its relaxed position. To prevent this, friction brake 55 is in contact with reel 13 creating sufficient frictional drag to prevent any rotation during storage and until the actual recording begins, at which time brake 55 is automatically released.

When the friction brake 55 is released after insertion of cartridge B hereinbefore described and the actual recording cycle begins, negator spring 39 tends to seek its normaly relaxed position back upon spool 42. This latter action causes spool 41 to tend to rotate such as to wind upon itself the Mylar film from hub spool 54. This forces take-up reel 13 to proceed in a direction of winding tape 19 onto said take-up reel.

Further explanation of the tape transport system is best understood by reference to FIGURES *4a, b, c* and 5.

FIGURE *4a* represents schematically the inter-reel drive system during the first half of the recording cycle. Tape from supply reel 12 is taken off in the direction of the arrow shown causing the entire reel to rotate including hub 54; simultaneously the tape is wound onto take-up reel 13 in a manner explained below.

Figure 4A:
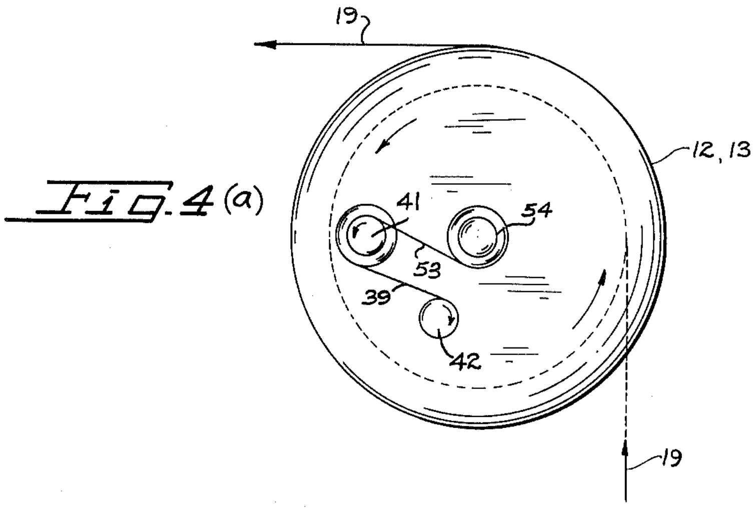
FIG. 4 is a series of schematic diagrams illustrating the function of certain components in FIGS. 1 through 3.
Figure 5A:
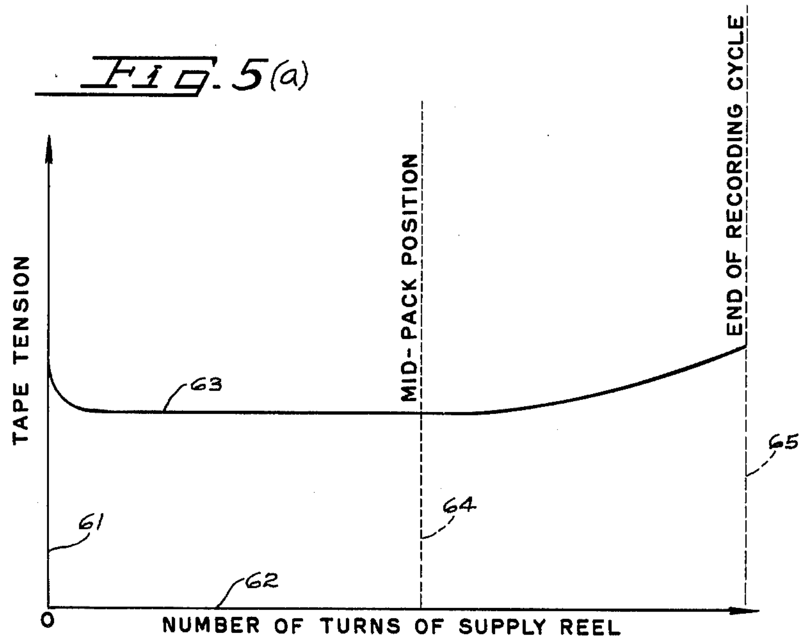
FIG. 5 is a view which shows comparative graphs of tape tension and reel rotation of the present invention and nearest known prior art in which *5a* shows the relationship of tension to the number of turns of tape on the supply reel with the mechanism of the present invention being employed and *5b* shows a graph showing the same relationship using conventional tape reel tensioning mechanism.

Proper and substantially constant tape tension between supply reel 12 and take-up reel 13 is caused by rotating reel 13, which has a smaller initial tape pack diameter than reel 12, with greater relative angular velocity than the latter. This is achieved by negator 39 rewinding onto spool 42 thus exerting a constant torque upon spool 41 and causing mylar film 53 to be wound from hub 54 to the upper portion of spool 41. In winding film 53 onto spool 41, the latter also rotates bodily about 54. As a result, the angular velocity initially imparted to reel 13 as shown in FIGURE 4*a* is the sum of the angular velocities of reel 12 and that produced by the wrapping of the Mylar film about spool 41. By particular selection of negator spring and ratio of spool 41 to hub 54 diameters, a given differential angular velocity between reels 12 and 13 is caused with resultant tension on tape 19 a function of such differential velocity. After overcoming the initial friction of the system and accelerating the reels to operating velocity, the tension in tape 19 becomes and remains essentially constant. Maintaining constant tension is more fully explained below and is shown graphically in FIGURE 5*a* where tape tension is represented by abscissa 61, increasing away from intersection with ordinate 62, turns of supply reel and qualitative values of tape tension as a function of the number of turns of the supply reel is represented by curve 63.

As the recording cycle proceeds from the schematic representation of FIGURE 4*a* to that of 4*b*, the tape pack diameter of 12 decreases while that of 13 increases. To maintain constant tape tension, it is necessary to decrease the greater relative angular velocity of reel 12. Tape 19 is pulled from reel 12 at a constant linear speed which causes the angular velocity of 12 to decrease as its tape pack decreases; this in turn causes the bodily rotation of spool 41 about 54 to decrease and hence decrease that component of the angular velocity imparted to reel 13. At the same time, the pack diameter of Mylar film 53 on spool 41 increases causing an increase in its torsional lever arm to the constant torque exerted by negator spring 39, which decreases the rate at which the Mylar film is wound about spool 41 and the component of angular velocity thus imparted to reel 13 in respect to that of 12. Consequently, as the recording cycle approaches that of mid position (equal tape packs on both reels) indicated at FIGURE 4*b*, and by mid line of 64 of FIGURE 5*a*, tape tension remains constant.

Figure 4B:
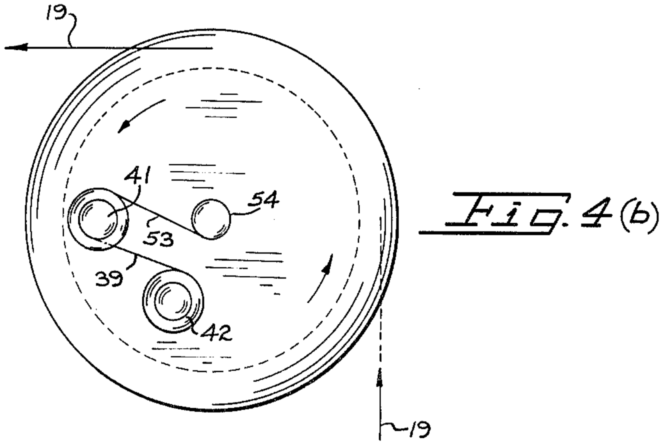

When mid position is reached as shown in FIGURE 4*b*, the tape packs are of equal diameter. At this point negator 39 has transferred completely to spool 42, except for the short stretch between spools and its attachment to 41, while film 53 has completely transferred to spool 41, except for the short stretch between the spool and hub 54 and attachment to the latter. Consequently, the angular velocity imported to reel 13 from reel 12 is limited to that of the bodily rotation of 41 about 54 which is precisely equal to that of reel 13. Since both reels are rotating with equal reel velocities and with equal tape pack diameters, the tape tension between reels does not change, remaining at the same constant level already established.

Since the number of turns of the negator spring and Mylar film is selected to be, when transferred to reels 12 and 13, in excess of the number more of turns necessary for the take-up reel to rotate than the supply reel in transporting one half of the total tape pack, the negator spring re-wind action described in the preceding paragraph ends when the tape packs on reels 12 and 13 are equal, i.e. when the first half of the recording cycle is completed.

Figure 4C:
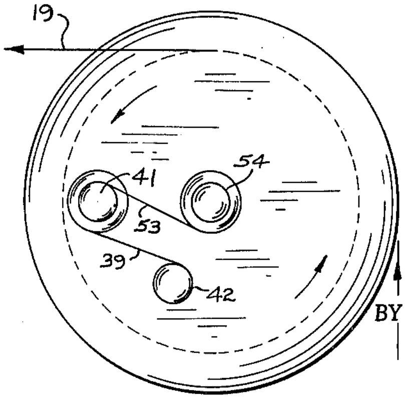

As the recording cycle continues past the mid position, schematically from FIGURE 4*b* to 4*c*, the tape pack diameter on reel 12 becomes smaller than that on reel 13. Since the Mylar film is now entirely wound on spool 41 and the negator spring completely transferred to spool 42 in normally relaxed position, rotation of hub 54 causes an immediate rewinding of the Mylar film to begin back onto the hub, which causes spool 41 to rotate and immediately begin rewinding of the negator spring from its position on spool 42 to its initial position on spool 41. Thus the angular velocity imparted to reel 13 by bodily rotation of 41 about 54 is decreased by the amount of angular velocity absorbed by the rewinding of the Mylar film about hub 54. This differential velocity of reel 12 with respect to reel 13 causes reel 13 to rotate at a lower angular velocity than reel 12 and the rate of tape transportation between reels to be constant. However, the negator spring is now being rewound to its initial position; this torque on spool 41 causes tension in the Mylar film being rewound on hub 54 which is counter balanced by increased tension in the tape being pulled at the constant linear speed from reel 12. The increase in tension is minimum immediately after the mid pack position of the tape reels due to the large Mylar film pack on spool 41 and increases as the Mylar film pack decreases i.e. while the system proceeds from the schematic representation of FIGURES 4*b* to 4*c*. Thus the differential angular velocity increases so that reel 13 rotates at its slowest angular velocity in respect to reel 12 at the close of the recording cycle maintaining equality of tape transportation between reels while the tape tension during this same interval increases slightly as represented by the curve to the right of mid line 64 (equal tape packs) shown in FIGURE 5*a* until the end of the recording cycle represented schematically at FIGURE 4*c* with respect to the inter-reel drive and line 65 of FIGURE 5*a*. When the recording cycle is completed, the tape is entirely stored on take-up reel 13 except for the short stretch between reels and the Mylar film and negator spring returned to their original positions. When the tape is rewound onto the supply reel all foregoing occurs in reverse.

Upon removal of the cartridge from the recording housing, friction brake 55 returns to its original position and prevents any motion of the reels as a result of the negator spring now returned to a torque exerting position. The cartridge may now be removed and prepared for playback.

Figure 5B:
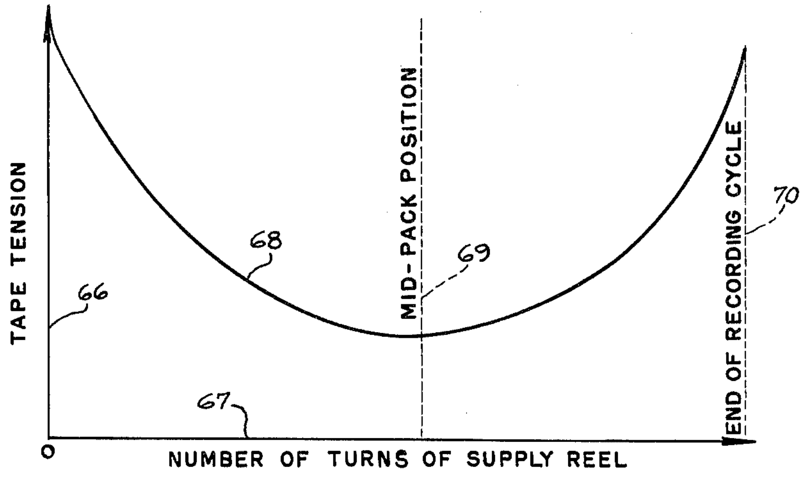

FIGURE 5*b* is a graphic representation of the nearest prior art devices to this invention known to the applicant utilizing negator springs wherein tape tension axis 66 is shown increasing from the intersection with axis 67; axis 67 represents the number of turns of the supply reel and, also increases away from the intersection with axis 66. Curve 68 represents tape tension as a function of turns of the supply reel. The scale of graph 5*a* is the same as that of 5*b* with mid pack line 69 and end of recording cycle line 70 corresponding to lines 64 and 65, respectively, of FIGURE 5*a*. In these devices the negator spring is coupled directly between the supply reel and the hub of the take-up reel. Because of such direct coupling, tape tension varies throughout the recording cycle as indicated by 68 causing undesirable variation in the tape signal intensity at the transducer which must be, in certain cases, compensated by additional electronic circuitry. In addition, the amount of tape tension is greater and causes undesirable power consumption in the resulting additional drag. Moreover, a given negator arrangement is useful only with one length and thickness of recording tape; in the present invention, by merely changing hub 54 and/or the upper portion of spool 41, numerous lengths and thicknesses of recording tapes may be accommodated without change in negator assembly. As can be seen by comparing curves 63 and 68 of FIGURES 5*a* and 5*b*, the total variation is far less.

Although only a single embodiment of the present invention is shown and described herein, it is intended to include all embodiments that may be practiced within the scope of the appended claims. For example, a coaxial relationship of the reels is shown, but side by side arrangement is also possible; only one negator spring and Mylar film are illustrated hereinabove, but it is possible to replace counter balance 45 with a second negator and Mylar assembly, wrapping both Mylar films about hub 54 in a bifilar or stacked manner.

I claim:

1. A tape drive for rotating a supply reel and a take-up reel in which information tape is transferred from the supply reel to the take-up reel under substantially constant tension, said supply reel having a hub fixedly mounted thereto, a torque transmitting tape wound in a spiral on said hub in a direction opposite to the information tape on said supply reel, a spool connected to said take-up reel, the opposite end of said torque transmitting tape connected in a spiral on said spool, means to cause said spool to rotate with the differential of rotation between said take-up and supply reel, and spring means connected to said spool in a spiral on a portion of said spool, and means including said spring means to generate a constant torque to urge said spool to rotate in a direction which will cause the torque transmitting tape to unwind from said supply reel hub.

2. A tape drive for rotating a supply reel and a take-up reel mounted for coaxial rotation in which information tape is transferred from the supply reel to the take-up reel under substantially constant tension, said supply reel having a hub fixedly mounted thereto, a torque transmitting tape wound in a spiral on said hub in a direction opposite to the information tape on said supply reel, a spool having a first hub portion and a second hub portion rotatably mounted eccentrically on the side of said take-up reel, the opposite end of said torque transmitting tape mounted on the first hub of said spool in a spiral, a negator spring mounted on said take-up reel, one end of said spring being spirally wound on the second hub of said spool in a direction to cause said spring to urge said spool to rotate in a direction which will cause the torque transmitting tape to unwind from said supply reel hub.

3. A tape drive for rotating a supply reel and a take-up reel mounted for coaxial rotation in which information tape is transferred from the supply reel to the take-up reel under substantially constant tension, said supply reel having a hub fixedly mounted thereto, a torque transmitting tape wound in a spiral on said hub in a direction opposite to the information tape on said supply reel, a spool having a first hub portion and a second hub portion rotatably mounted eccentrically on the side of said take-up reel, the opposite end of said torque transmitting tape mounted on the first hub of said spool in a spiral, a constant torque motor and means interconnecting said constant torque motor and the second hub of said spool to urge said spool to rotate in a direction to cause the torque transmitting tape to unwind from said supply reel hub.

4. In a tape recorder having a main body portion adapted to carry a recording transducer and a capstan drive assembly for driving tape and a cartridge adapted to carry a tape supply reel and take-up reel for engagement of the tape with said transducer and tape drive assembly when said cartridge is mounted on said main body, the improvement comprising means mounting said supply and take-up reel in spaced coaxial alignment within said cartridge, guide means mounted in said cartridge adjacent said take-up and supply reels, to guide said tape to travel in an elongate stretch between said two reels, said cartridge being open on one side adjacent the elongate tape stretch to allow said transducer and capstan drive to make contact with the tape stretch when said cartridge is mounted on said main body, tape deflecting means mounted on opposite sides of the portion of tape engaged by said transducer and positioned outwardly from the position of transducer engagement with said tape to cause the tape to wrap around the transducer, a pair of capstan guide means mounted on opposite sides of the portion of tape engaged by said capstan when said cartridge is mounted on said main body, said capstan guide means mounted outwardly of the point of engagement of the capstan with said tape, to cause the tape to wrap around a portion of said capstan, spring powered motor means mounted between said two reels, means connecting said spring power motor means to the respective two reels to tension said reels in constant tension to rotate in opposite directions relative to each other to maintain the tape stretch between the two reels under tension.

5. A tape drive for a recording device, comprising a supply reel and a take-up reel, means mounting said two reels in coaxial alignment, tape guide means guiding the tape for tape travel from said supply reel to said take-up reel, said tape guide means having at least two guide spools to establish a straight stretch of tape in the tape path between said supply and take-up reels, a transducer in contact with a portion of the straight stretch of tape, deflecting means for deflecting the tape travel mounted on opposite sides of said transducer to cause the tape to wrap around a portion of said transducer, a tape drive capstan engaged with said tape in a portion of said straight stretch, and tape guide means mounted on opposite sides of said capstan to cause said tape to wrap around a portion of the capstan, means for rotating said capstan at a constant rate, spring powered motor means mounted between said two reels, means connecting said spring power motor means to the respective two reels to tension said reels in constant tension to rotate in opposite directions relative to each other to maintain the tape stretch between the two reels under tension.

6. In a tape recorder having a main body portion adapted to carry a recording transducer and a capstan drive assembly for driving information tape and a cartridge adapted to carry a tape supply reel and take-up reel for engagement of the tape with said transducer and tape drive assembly when said cartridge is mounted on said main body, the improvement comprising means mounting said supply and take-up reel in spaced coaxial alignment within said cartridge, guide means mounted in said cartridge adjacent to said take-up and supply reels to guide said information tape to travel in an elongate stretch between said two reels, said cartridge being open on one side adjacent the elongate tape stretch to allow said transducer and capstan drive to make contact with the information tape stretch when said cartridge is mounted on said main body, tape deflecting means mounted on opposite sides of the portion of information tape engaged by said transducer and positioned outwardly from the position of transducer engagement with said information tape to cause the tape to wrap around the transducer, a pair of capstan guide means mounted on opposite sides of the portion of information tape engaged by said capstan when said cartridge is mounted on said main body, said capstan guide means mounted outwardly of the point of engagement of the capstan with said information tape to cause the tape to wrap around a portion of said capstan, a hub secured at the center of said supply reel, a torque transmitting tape wound in a spiral on said hub in a direction opposite to the information tape on said supply reel, a spool having a first hub portion and a second hub portion rotatably mounted eccentrically on the side of said take-up reel, the opposite end of said torque transmitting tape mounted on the first hub of said spool in a spiral, a constant torque motor and means interconnecting said constant torque motor and the second hub of said spool to urge said spool to rotate in a direction to cause the torque transmitting tape to unwind from said supply reel hub.

7. In a tape recorder having a main body portion including a capstan drive assembly, information tape driven by said drive assembly, and a cartridge adapted to carry an information tape supply reel and take-up reel and receive said capstan drive assembly when said cartridge is mounted on said main body, the improvement comprising means mounting said supply and take-up reel in spaced alignment within said cartridge, guide means mounted in said cartridge adjacent one side of said cartridge to guide said information tape in an elongate stretch between said reels, said cartridge being open on one side adjacent to the elongate tape stretch to allow said capstan drive to contact tape stretch when said cartridge is mounted on said main body, capstan guide means mounted on opposite sides of said capstan to engage the portion of information tape in contact with said capstan when said cartridge is mounted on said main body portioin, a hub portion secured about said supply reel, a torque transmitting tape wound in a spiral on said hub portion, interconnecting means attached to said take-up reel, the opposite end of said torque transmitting tape connected to said interconnecting means, a constant torque motor and means interconnecting said constant torque motor and said interconnecting means to urge said hub portion to rotate in a direction to cause the torque transmitting tape to unwind from said hub portion.

8. In a tape recorder having a main body portion adapted to carry a capstan drive assembly for driving information tape and a cartridge adapted to carry information tape supply reel and take-up reel for engagement of the information tape with the capstan drive assembly when said cartridge is mounted on said main body, the improvement comprising means mounting said supply and take-up reel in spaced coaxial alignment within said cartridge, said supply reel having a hub fixedly mounted thereto, a torque transmitting tape wound in a spiral on said hub in a direction opposite to the information tape on said supply reel, a spool having a first hub portion and a second hub portion rotatably mounted eccentrically on said take-up reel, the opposite end of said torque transmitting tape mounted in a spiral on said first hub portion, a constant torque motor and means interconnecting said constant torque motor and said second hub portion to urge said spool to rotate in a direction to cause the torque transmitting tape to unwind from said supply reel hub.

9. A tape drive for a recording device comprising a supply reel and a take-up reel, means mounting said two reels in coaxial alignment, tape guide means guiding the tape for tape travel from said supply reel to said take-up reel, said tape guide means having at least two guide spools to establish a straight stretch of tape in the tape path between said supply and take-up reels, a transducer in contact with the portion of the straight stretch of tape, deflecting means for deflecting the tape travel mounted on opposite sides of said transducer to cause the tape to wrap around a portion of said transducer, a tape drive capstan engaged with said tape in a portion of said straight stretch, and tape guide means mounted on opposite sides of said capstan to cause said tape to wrap around a portion of the capstan, means for rotating said capstan at a constant rate, said supply reel having a hub fixedly mounted thereto, a torque transmitting ribbon wound in a spiral on said hub in a direction opposite to the tape on said supply reel, a spool rotatably mounted on said take-up reel, the opposite end of said torque transmitting ribbon connected in a spiral on said spool, means to cause said spool to rotate with the differential of rotation between said take-up and supply reel, spring means wound in a spiral on a portion of said spool, and means including said spring means to generate a constant torque to urge said spool to rotate in a direction to cause the torque transmitting ribbon to unwind from said supply reel hub.

10. In a tape recorder having a main body portion adapted to carry a recording transducer and a capstan drive assembly for driving tape, and a cartridge adapted to carry a tape supply reel and take-up reel for engagement of the tape with said transducer and tape drive assembly when said cartridge is mounted on said main body, the improvement comprising means mounting said supply and take-up reel in spaced coaxial alignment within said cartridge, guide means mounted in said cartridge adjacent to said take-up and supply reels to guide said tape to travel in an elongated stretch between said two reels, said cartridge being open on one side adjacent to the elongate tape stretch to allow said transducer and capstan drive to make contact with the tape stretch when said cartridge is mounted on said main body, tape deflecting means mounted on opposite sides of the portion of tape engaged by said transducer and positioned outwardly from the point of engagement of said tape with said transducer, a pair of capstan guide means mounted on opposite sides of the portion of tape engaged by said capstan when said cartridge is mounted on said body, said capstan means mounted outwardly of the point of engagement of the capstan with said tape, a hub mounted on said supply reel, a torque transmitting ribbon wound in a spiral on said hub in a direction opposite to the tape on said supply reel, a spool connected to said take-up reel, the opposite end of said torque transmitting ribbon connected in a spiral on said spool, means to cause said spool to rotate with the differential of rotation between said take-up and supply reel, spring means connected to said spool in a spiral on a portion of said spool, and means including said spring means to generate a constant torque to urge said spool to rotate in a direction which will cause the torque transmitting ribbon to unwind from said hub.

References Cited by the Examiner

UNITED STATES PATENTS 1,952,904 3/1934 Bostwick ---------- 242—75
2,996,264 8/1961 Bygdnes --------- 242—55.14

L. D. CHRISTIAN, *Assistant Examiner.*

MERVIN STEIN, *Primary Examiner.*